April 26, 1966   L. V. BLACK ET AL   3,248,201
GLASS BENDING MOLD WITH PIVOTED END SECTIONS
Original Filed July 20, 1953   3 Sheets-Sheet 1

INVENTOR.
LLOYD V. BLACK
JAMES S. GOLIGHTLY
BY Oscar L. Spencer
ATTORNEY

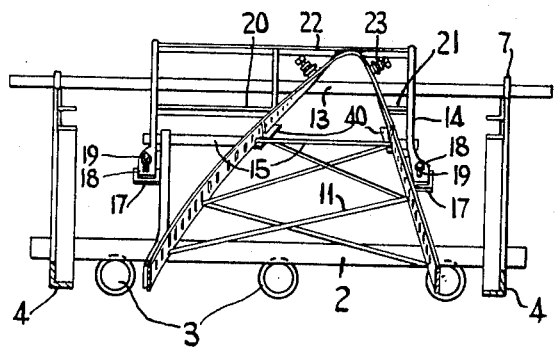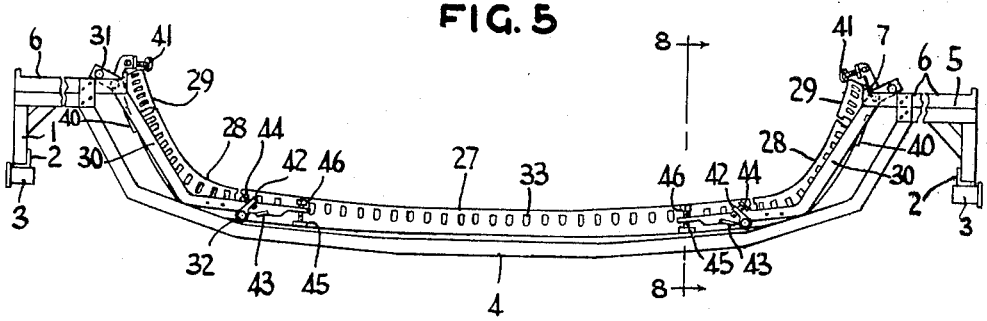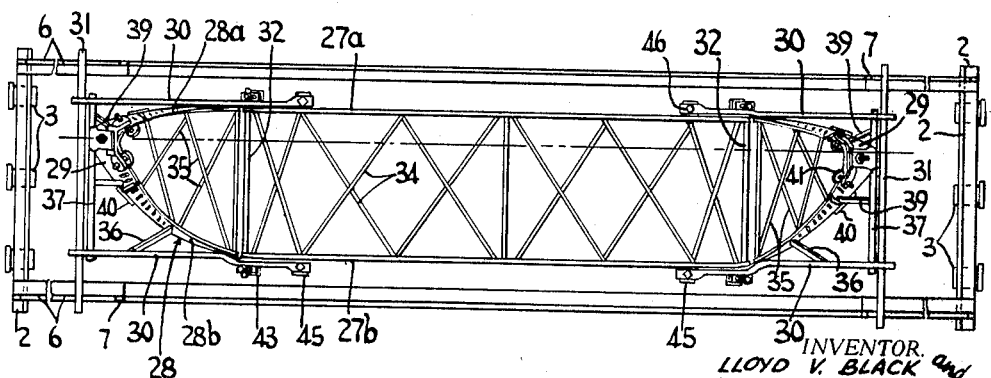

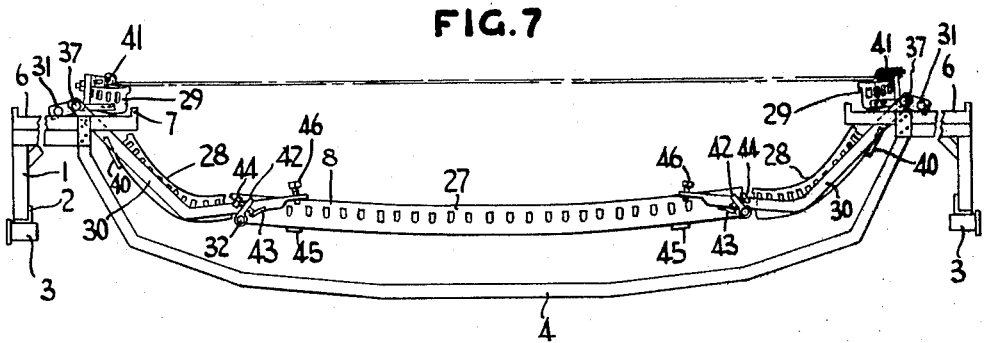
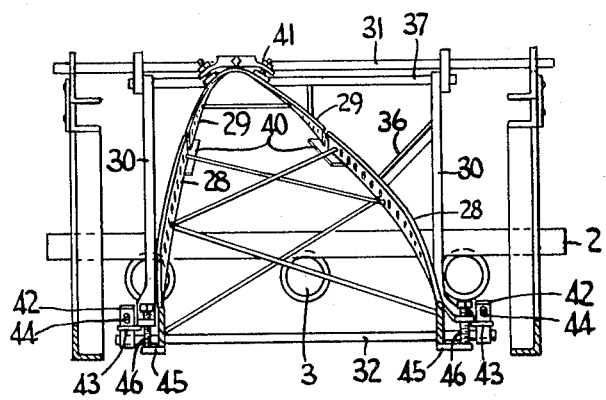
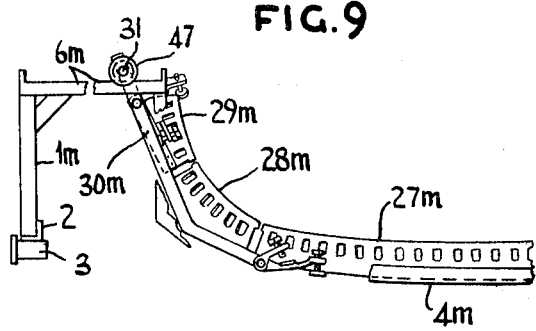
INVENTOR.
LLOYD V. BLACK and
JAMES S. GOLIGHTLY
BY
Oscar L. Spencer
ATTORNEY

United States Patent Office 3,248,201
Patented Apr. 26, 1966

3,248,201
GLASS BENDING MOLD WITH PIVOTED END SECTIONS
Lloyd V. Black, Murphy, N.C., and James S. Golightly, Fox Chapel, Pa., assignors to Pittsburgh Plate Glass Company, Pittsburgh, Pa., a corporation of Pennsylvania
Continuation of abandoned application Ser. No. 368,958, July 20, 1953. This application Jan. 6, 1964, Ser. No. 335,956
16 Claims. (Cl. 65—290)

This application is a continuation of application Serial No. 368,958, filed July 20, 1953, for Glass Bending Mold, now abandoned.

The present invention pertains in general to glass bending and specifically to sectional molds for bending flat glass sheets into various forms as are used in present day laminated automobile windshields and tempered backlights. Such molds include a plurality of sections which are pivotally connected for movement into open and closed positions. When opened, the mold sections are spread to receive a cold flat glass sheet. The open mold and flat sheet are then passed through a heated bending lehr wherein the mold and glass are both heated. The heated glass softens permitting the mold sections to move to closed position. In closing, the mold shapes the glass to the contour of the mold sections.

In a copending application of Lloyd V. Black, Serial No. 238,943, filed July 27, 1951, now U.S. Patent No. 2,736,140, there were disclosed generic types of the bending molds herein claimed. In that copending application, the molds were constructed to form substantially simple longitudinal bends.

In the present application, the curvature of the glass at the ends of the bent sheet are curved into rather sharp radii and have considerably longer bent end portions than earlier constructions. Since extreme lengths of flat glass sheets are required to produce these bent shapes, it has become necessary to provide bending molds having the sections thereof of suitable length and sequence of operation to shape the glass substantially before permitting it to engage the mold sections in order to avoid movement of the glass relative to the mold sections after engagement with the mold shaping surfaces.

Mold design has been further complicated by the use of tempered glass in automobile backlights. The manufacture of tempered glass is well known in the art and, therefore, no detailed description thereof is necessary here. Economical production of such backlights necessitates using the same molds for bending the glass and for carrying the bent heated glass through the tempering machines. Therefore, prime requirements of such bending molds are a minimum of metal to be heated during the bending operation so that little temperature differential exists between the mold and glass during bending, and a mold which cools quickly during the tempering operation so that residual heat in the mold does not anneal the glass in contact with the mold.

An object of the invention is to provide a glass bending mold having a plurality of pivotally connected glass shaping sections which form the glass sheet to the desired contour with substantially no relative movement between the mold and the glass moving into contact therewith.

Another object of the invention is to provide a glass bending mold of a plurality of pivotally connected glass shaping surfaces in which the center section functions as a control member for the pivotal movement of the sections pivotally connected therewith.

Another object of the invention is to provide a glass bending mold comprising a plurality of pivotally connected sections in which the weight of the mold is suspended through the centermost section.

Another object of the invention is to provide a glass glass bending mold comprised of a plurality of sections and a supporting frame, for the mold, in which the means suspending the mold from the frame pivots upon the frame and the center section of the mold.

Another object of the invention is to provide a glass bending mold comprised of a plurality of sections in which the end sections are movable independently of the remaining mold sections.

Another object of the present invention is to provide an improvement in sectionalized skeletonized bending molds involving using spaced points along the mold shaping surface intermediate the mold extremities for supporting irregularly shaped elongated flat glass sheets on opposite sides of the longitudinal axis passing through the center of gravity of the glass sheet so that the latter remains in proper alignment and is not tilted transversely of the mold during the bending operation.

These and other objects of the invention will be apparent as the description proceeds.

In the drawings forming part of this disclosure,

FIG. 4 shows a cross section of the mold and frame of FIG. 1 taken on lines 4—4 of FIG. 2;

FIG. 5 shows in side elevation a modified form of the invention with the mold in closed position;

FIG. 6 shows a plan view of the mold and frame of FIG. 5;

FIG. 7 is a side elevation of the mold and frame with the mold in open position and supporting a flat glass sheet;

FIG. 8 shows a cross section of the mold and frame taken on lines 8—8 of FIG. 5; and FIG. 9 shows in side elevation a portion of a mold similar to that of FIG. 5, having a modified form of support upon the frame.

Figure 1:
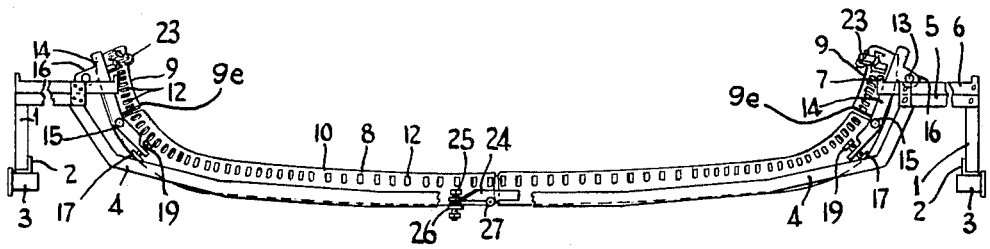
FIG. 1 shows a side elevation of one form of my invention with the mold in closed position and illustrating the method of suspending same from the supporting frame.

Referring now in detail to the drawings and particularly FIGS. 1 to 4, inclusive, the frame for support of the mold approximates the shape of the mold in closed position. This frame comprises vertically disposed spaced end members 1 at each end of the frame which are connected by tie members 2 arranged for contact with lehr conveyor stub rolls 3 for moving the frame and mold through the bending lehr. These end members 1, at each side of each end of the frame, are connected by the side members 4 which approximate the shape of the mold in closed position. Each side member 4 has a flat portion 5 at each end thereof for engagement by the mold support members. We prefer, however, to provide an extension 6, on each portion 5, which is disposed inwardly from the end of the frame to provide for support of the mold. At the inner end of the frame extension 6 is provided a stop 7 preventing displacement of the mold from the frame. As shown by the drawings, the frame members deepen varying distances below the level of the lehr rollers 3 and are spaced wider than the mold so as to permit ready access of the glass tempering machine within the frame. Likewise, the frame extensions 6 carry the mold in spaced relation to the frame end members 1 and 2 and provide ready access of the tempering machine to the end sections of the mold and the glass thereon.

Figure 2:
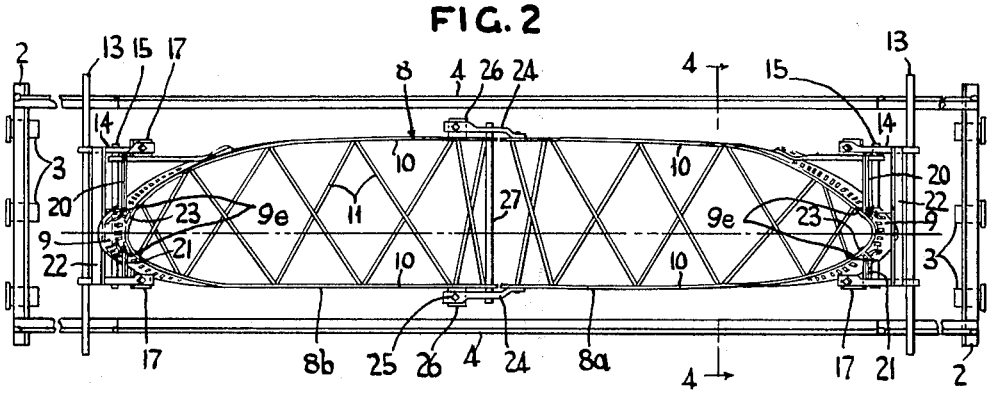
FIG. 2 shows a plan view of the mold and frame of FIG. 1.

The mold of FIG. 1 is a three-section mold comprised of a center or intermediate section 8 and end sections 9 disposed in end to end relation. Each of these sections has an upper surface of the shape to which the glass is to be bent. The center or intermediate section 8 is formed of two spaced thin metal side members 10. The metal is preferably stainless steel which resists warping at the temperatures at which the glass is bent. Each member 10 has a plurality of openings 12 adjacent the top edge or glass supporting surface to permit ready escape of the air blown against the underside of the glass when the mold is used to support the glass during the tempering operation. The members 10 are held in spaced relation by cross bracing members 11. As best shown in FIGS. 1 and 2 of the drawings, the members 10 are curved both longitudinally and transversely of the mold to follow the contour of the bent glass shape to be formed thereon. The end mold sections 9 are likewise formed of thin metal side members curved to conform to the contour of the bent glass. These members 9 also have openings 12 near the top or glass supporting surface to permit ready escape of air when the mold and glass thereon are within the tempering machine. In cases where the mold is not used to support the glass in the tempering operation, as where the glass being bent is to be laminated and not tempered, such openings 12 are not necessary in either sections 8 or 9.

The center or intermediate section 8 of the mold is suspended from the frame members 6 by means of the support rods 13, support arms 14 and center section pivot members 15. The support rods 13 may be directly connected with the support bars 14 or through lugs 16 rigidly connected to the bars 14. As shown in FIG. 1, the support arms 14 extend beyond the pivot members 15 for selective engagement with stops 17 mounted on the center or intermediate section 8 to limit pivotal movement of the arms 14 in one direction relative to the center or intermediate sections. The engagement of bar 14 with stop 17 may be made adjustable by mounting on bar 14, by means of a suitable member 18, a cap screw 19 which engages the stop 17.

The end mold sections 9 are rigidly connected to the support arms 14. Since the end sections are narrower than the center or intermediate section 8, it is sometimes necessary to connect end sections 9 with the support arms 14 by transverse members such as 20 and 21. If desired, the end mold section 9 may also be connected with the adjacent bars 14 by means of an additional transverse member 22.

The pivot members 15 mounted on the center section may be of any desired form. The most convenient form is to pass a continuous rod 15 through both sides of the center section and extend the ends of the rods a sufficient distance to engage the support arms 14. These are details of construction which are determined by the specific shape of the mold sections and the convenience of the mold manufacturer.

Figure 3:
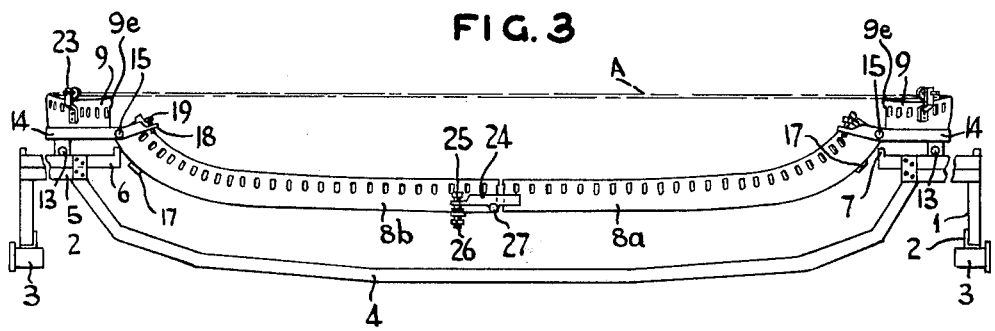
FIG. 3 is a view similar to that of FIG. 1 with the mold in open position to receive a flat sheet of glass in position for passage through the heating and bending lehr.

The usual glass engaging members 23 are mounted on the end mold sections 9. The number and location of such members 23 is dictated by the shape of the flat glass sheet to be bent. Care must be taken so that the glass sheet does not tilt during the bending thereof otherwise it may not fit the mold properly and result in rejection. Since the end portions of the glass are disposed wholly to one side of the center of gravity of the flat sheet, the glass engaging members cannot retain the glass sheet in equilibrium on the closing mold. For this reason I prefer to so locate the support rod 13 so that the free ends 9e of mold sections 9 engage the glass and support it on opposite sides of its longitudinal axis passing through its center of gravity in its initial flat position as shown in FIG. 3 and also during initial closing movements of the mold.

In operation, the mold normally depends from its support rods 13 upon the arms 14. To load the mold with a glass sheet, the center or intermediate section 8 is raised vertically causing the end sections 9 and their attached support arms 14 to pivot about the center or intermediate section on pivots 15 and the support rods 13 slide outwardly along the frame members 6 as the mold opens. A flat glass sheet of the proper size to produce the desired bent shape is mounted on the mold, between the glass engaging members 23. The center or intermediate section 8 is then lowered slightly so that the glass engaging members 23 engage opposite ends of the glass. The weight of the center or intermediate section 8 acting through support arms 14 and end sections 9 places the glass sheet in compression. The mold and glass are then passed slowly through a bending lehr where the glass, as it softens, bends under the compressive forces so applied. In the flat glass supporting position, the free ends 9e of the end sections 9 are in the horizontal plane defined by the outboard extremities of the end sections, as shown in FIG. 3, to provide flat glass sheet supporting means intermediate the longitudinal extremities of the supported flat glass sheets.

The mold sections 8 and 9 are of slightly less width than the glass sheet so that the glass as it sags to the mold is supported inwardly of the edges thereof. As fully described in my copending application, Serial No. 238,943, now U.S. Patent No. 2,736,140, the bending lehr is preferably heated by electrical heating coils disposed above the glass on the molds. By suitable arrangement and operation of the heating coils, the glass may be selectively heated to higher temperatures at certain areas thereof. Due to the extreme lengths of the glass sheets sometimes bent on molds of this design, the center section of the glass tends to sag before the end sections. By the selective heating referred to, the glass may be so heated that the glass is bent in such a manner that no substantial movement of the glass, relative to the mold, occurs after the glass contacts the mold. The mold therefore moves to closed position with the softening of the glass, and the glass conforms to the contour of the closed mold. The free ends 9e of the end sections 9 move to positions below the flat horizontal plane defined by the outboard extremities of the end sections as the mold moves to its closed position.

Several adjustments are provided in the molds of FIGS. 1 to 4, inclusive. As shown in FIG. 1 of the drawanfs, the support arms 14 do not directly contact stop 17 on the center or intermediate section. This contact is made through the adjusting screw 19. By suitable manipulation of screw 19 the relative positions between end sections 9 and center or intermediate section 8 of the mold may be regulated. A further adjustment is provided by the arm 24, screw 25 and stop 26 on the center or intermediate section 8. By splitting center or intermediate section 8 into two parts, welding one end of arm 24 to section 8A and pivoting arm 24 on section 8B as by pivot rod 27, the end mold sections may be spread a greater distance than would be possible if the center or intermediate section were in one piece. This slight pivotal movement between sections 8 and 8A will facilitate loading of the glass upon the mold. A mold such as in FIG. 3 has the end sections substantially flat in opened position so as to help support the glass. If the glass sheet is slightly long, the mold may not open sufficiently to receive the glass. When the center or intermediate section has an adjustable pivotal connection, a slight pivotal movement between the sections 8A, 8B opens the mold wide enough to receive the glass. The sections 8A and 8B, then return substantially to normal position before the glass is heated, or shortly thereafter so that this hinging movement does not enter into the shaping of the glass.

FIGS. 5 to 8 of the drawings illustrate a modification of the mold previously described. This modified mold is comprised of five sections. The center and intermediate sections are supported in the manner shown in FIG. 3. The end sections are supported in a different manner and move independently of the intermediate sections.

Referring now in detail to FIGS. 5 to 8, the frame for supporting the mold is of substantially the same design as that shown in FIG. 1. The mold comprises a center section 27, intermediate sections 28 and end sections 29. The center section 27 is located intermediate the intermediate sections 28 and is suspended from the frame member 6 by means of the support arms 30 which are pivotally connected to each side of each end of the center section 27 and rigidly connected to the support rods 31. The pivotal supports 32 on the member 27 for the support arms 30 may be a rod as in FIG. 1 or separate pivot members. The rod 32 is preferred as it ties the center section side members together. These center section side members 27a and 27b are thin metal strips preferably provided with apertures 33 as in FIG. 1. Suitable bracing members 34 connect the side members of the center section.

The intermediate sections 28 are likewise formed of thin metal strips 28a and 28b suitably connected by bracing members 35. These members 28 are rigidly connected to the adjacent support arms 30 for pivotal movement therewith about the pivotal support 32 on the center section 27. Due to the pronounced curvature of one side of the intermediate section 28, it may be desirable to extend a brace member 36 between the member 28 and the adjacent support arm 30.

The end sections 29 of the mold are mounted for pivotal movement relative to the support arms 30 by means of a cross member 37 which is connected with the end section and the support arms 30. By reason of such mounting, each end section 29 is bodily movable relative to intermediate mold section 28. These end sections 29 are preferably formed of a single thin metal strip 38 of substantially U-shape. The open end of the strip forms a continuation of the mold contour defined by the intermediate section 28. Suitable bracing members 39 retain the contour of the end section. Any suitable means may be provided for limiting movement of end section 29 to insure alignment thereof with the intermediate section 28, such as the stop member 40 extending outwardly from the lower edge of the intermediate section for engagement with the end section. The usual glass engaging members 41 are mounted on each section 29 for supporting the glass as in the mold of FIG. 1.

As clearly illustrated in FIG. 7, each end section 29 serves to support the glass above the mold at its inboard and outboard longitudinal extremities during the initial bending operation for the same reasons as explained in connection with FIGS. 2 and 3. In FIG. 7, however, the end section 29 is movable relative to support arms 30, and it would be possible to raise center section 27 a sufficient distance so that sections 29 when raised would be spaced a much greater distance than the length of the glass sheet. In some cases the end edges of the sheet might be damaged by sliding along the end section 29 to engage the glass engaging members 41. In other cases the workmen may attempt to mount the glass between the glass engaging members 41 without raising the end sections 29 so that the glass would not be properly supported on the mold to produce the desired shape and may even fall off in the lehr. To avoid all such undesirable conditions, we provide an additional adjustable stop for limiting movement of the support arms 30 and intermediate sections 28 relative to the center section 27. One form of such an additional adjustable stop is shown in FIGS. 5 and 7. Here the arm 42 is rigidly mounted on pivot rod 32, a stop 43 is mounted on support arm 30 and an adjustable member such as 44 is mounted on arm 42 for engagement with stop 43. As in FIGS. 1 to 4 relative movement between the ends of support arms 30 and center section 27 is limited in the mold closing position by stop 45 on the center section 27 and adjustable stop engaging member 46 on the adjacent end of support arm 30.

In movement of the mold of FIG. 7 from closed to opened position, the center section 27 is raised causing intermediate sections 28 to rotate upon the pivot rods 32 and spread outwardly until stop 43 engages the member 44 preventing further pivotal movement. The end sections 29 are then raised and the glass is disposed between the glass engaging members 41 and upon the end edge of end section 29. The adjustment of stop 43 and member 44 is such that when end sections 29 are raised to substantially horizontal position for supporting the glass, the spacing between glass engaging members 41 at opposite ends of the mold is slightly greater than the exact length of glass required to produce the desired bent shape. The center section 27 is then lowered slightly so as to engage both ends of the glass with the members 41. The above relationship permits use of glass that is slightly longer than the exact required size but within acceptable commercial tolerances.

A further modification of my invention is shown in FIG. 9. Here the mold is the same as that of FIG. 5, that is comprised of the center section 27m, intermediate sections 28m and end sections 29m, all connected as in FIG. 5. The arms 30m are made longer than the arms 30 of FIG. 5 and a roller 47 is mounted on the support rod 31. The roller 47 moves freely along the frame member 6m and reduces frictional forces which might retard the closing movements of the mold.

Inventions other than those claimed in the present application are based on matter disclosed herein. Sectionalized molds provided with means other than points along the mold shaping surface to support an irregularly shaped glass sheet intermediate its extremities are described and claimed together with the generic concept of flat sheet supporting means movable in synchronism with the movement of the mold sections of a sectionalized mold to a position in a plane defined by the mold extremities intermediate and spaced from the latter a minimum distance equal to the length of one of the end mold sections when the mold sections move into a spread mold posiiton to receive flat glass for bending and to a position below a plane defined by the mold extremities intermediate the latter when the mold sections move into a closed mold position in copending continuation-in-part application Serial No. 710,964 of Lloyd V. Black for Bending Glass Sheets, filed January 24, 1958, now U.S. Patent No. 3,192,029. The use of converging end portions of the mold shaping surface to help support the extremities of a glass sheet precut to outline before bending and the provision of stop members associated with the converging end portions of the mold are claimed in copending divisional application Serial No. 735,542 of Lloyd V. Black, filed May 15, 1958, for Glass Bending Mold, now abandoned.

A common feature of all the modifications disclosed above is the provision of spaced points of support for the flat glass sheet in the spread mold position. These spaced points of support form triangles with the support point provided by each longitudinal mold extremity. The spaced points of support are located on opposite sides of the longitudinal axis passing through the center of gravity of the sheet to support the sheet in a flat horizontal plane as shown particularly in FIGS. 3 and 7.

Another benefit of the spaced points of support is that the thermal stresses resulting from heat transfer through conduction between the metal and the metal contacted glass, because of the temperature differential therebetween established during heating due to the different thermal capacity of the glass sheet and the metal, are minimized when the areas of contact between the metal and the glass are minimized. If the glass contacts a large area of metal during heating, thermal stresses of considerable magnitude are likely to result in glass fracture when the glass and the mold are subjected to the wide temperature variations incidental to a glass bending cycle.

The disclosure of particular embodiments of the present invention has been made for the purpose of illustration rather than limitation. Reference to the latter may be had by reference to the following claims.

In order to correlate the terms recited in the claims with the present disclosure, the glass panes claimed are synonymous with glass sheets, the transverse horizontal axes claimed refer to the axes intermediate the ends of the end mold sections 9 defined by support rods 13, the top faces claimed refer to the upper surfaces of the glass engaging members 9 and 10, the pivots claimed refer to pivot members 15, and the high points claimed on the shaping surface refer to the inner ends 9e of the end mold sections.

What is claimed is:

1. Glass bending apparatus comprising a supporting frame, a glass bending mold including a pair of end mold sections and at least one mold section intermediate the end mold sections, said mold sections being relatively movable into a spread position to receive an unbent glass sheet for bending and into a closed position to provide a substantially continuous shaping surface conforming in elevation and outline to the shape desired for the bent glass sheet, mold supporting arms pivotally connected at one end to said intermediate member, means supporting the free ends of the mold supporting arms from the frame, each end mold section being free from direct connection at its inboard extremity with another mold section and connected to an adjacent mold supporting arm for movement therewith to support a glass sheet at its longitudinal extremities above the intermediate mold section in the open mold position.

2. Apparatus as in claim 1, wherein the mold supporting arms are arranged in laterally opposed pairs and the free ends of laterally opposed mold supporting arms are interconnected.

3. Apparatus as in claim 2, wherein the mold supporting arms are concave in elevation so that they are disposed below the mold sections in both the spread and closed mold positions to facilitate loading the unbent sheet on the mold and unloading the bent sheet from the mold.

4. Apparatus as in claim 1 in which the end mold sections engage the flat glass sheet at spaced points on opposite sides of its longitudinal axis passing through its center of gravity when the mold is in open position.

5. Apparatus as in claim 1 in which the intermediate mold section is hinged intermediate its ends for limited pivotal movement to provide additional opening movement to the mold for mounting slightly oversized glass between the end mold section stop members.

6. Apparatus as in claim 1, including flat sheet supporting means located intermediate and spaced from the mold extremities in the plane defined by the latter a minimum distance equal to the length of one of said end mold sections to provide spaced points of support on opposite sides of the longitudinal axis passing through the center of gravity of the glass sheet when the mold is in its spread position.

7. Apparatus as in claim 6, wherein the intermediate flat sheet supporting means form triangles of spaced supporting points with support points provided by the longitudinal mold extremities on either side of the center of the sheet.

8. In a glass bending apparatus, in combination, a frame comprising side members and connecting end members, a glass shaping mold comprising a plurality of mold sections, including a mold center section disposed between the frame side members, mold suspension members pivotally connected intermediate their ends with each side of each end of the mold center section, a tie rod connecting adjacent ends of the mold suspension members beyond the center mold section and movably engaging the adjacent frame side members for supporting the mold in open and closed position, stop means associated with the inner ends of the mold suspension members and the adjacent center mold section for limiting relative pivotal movement therebetween as the mold moves to closed position, intermediate mold sections rigidly connected with the mold suspension members for movement therewith, and end mold sections pivotally connected with the mold suspension members for independent pivotal movement relative thereto, said end mold section when in open position providing a support for a flat glass sheet in vertically spaced relation to the other mold sections.

9. Apparatus as in claim 8, including means limiting relative pivotal movement between the center section and mold suspension members in both opening and closing movements of the mold.

10. Apparatus as in claim 8 in which the end sections when in open position engage a flat glass sheet at spaced points on opposite sides of the longitudinal axis passing through its center of gravity.

11. Apparatus as in claim 10 in which the spaced points of the individual mold sections in contact with the glass are in triangular configuration.

12. Apparatus as in claim 8 in which the end mold sections have upper surfaces forming parts of the mold shaping surface and its mold suspension members extend below said upper surfaces in both the open and closed mold positions.

13. In a glass bending apparatus, in combination, a frame comprising side members and connecting end members, a glass shaping mold including a center mold section and a plurality of additional molding sections movable relative to the center molding section in one direction into a spread mold position, C-shaped end molding sections included in said additional molding sections to support a flat sheet of glass only at both longitudinal outboard extremities of the mold and at intermediate support points at the inboard extremities of each end molding section in the open mold position, said support points being located on either side of the longitudinal axis passing through the center of gravity of the glass, said additional molding sections movable in the opposite direction to provide together with the center molding section a substantially continuous frame having the contour desired for the margin of the bent glass sheet, and means for supporting the mold upon the frame.

14. In a glass bending apparatus, in combination, a frame comprising side members and connecting end members, a glass shaping mold consisting of three mold sections disposed in end-to-end relation longitudinally of one another and movable into a spread posiiton for mounting a flat sheet of glass on said mold and into a closed position to provide a substantially continuous frame with an upper surface of said frame having the contour desired for the margin of the bent glass sheet, each extreme mold section having an upper glass engaging surface of concave elevation providing spaced points of support for the flat glass sheet only at a mold extremity and at points spaced from the longitudinal extremities of the glass on either side of the longitudinal axis passing through the center of gravity of the glass, when the mold is in its spread position, and means for supporting the mold on the frame.

15. Apparatus for bending glass to curved shapes comprising a plurality of shaping rail sections consisting of a center section and end sections flanking said center section in end-to-end relation therewith, the sections having upper shaping surfaces of concave elevation and being movable into a spread mold position to support an unbent glass sheet and into a closed mold position where their upper shaping surfaces form a substantially continuous outline corresponding to the shape desired for the bent sheet, wherein only portions of the mold shaping surface intermediate and spaced from its extremities are in a plane defined by the mold extremities when the mold sections move into the spread mold position to support an unbent glass sheet and are in a position below a plane defined by the mold extremities intermediate the latter when the mold sections move into the closed mold position.

16. In a glass sheet bending apparatus, in combination, a frame comprising side members and connecting end members, a glass shaping mold mounted on said frame and including a plurality of mold sections comprising a center mold section, an intermediate mold section beyond each longitudinal extremity of said center mold section and end mold sections beyond the outer longitudinal extremity of each said intermediate mold section, said plurality of mold sections being movable into a spread position for mounting a flat sheet of glass on said mold and into a closed position wherein said sections are in end-to-end relationship with one another to provide a substantially continuous shaping surface having the contour desired for the bent glass sheet, each end mold section having an upper glass engaging surface of concave elevation providing intermediate points of support for the flat glass sheet only at points intermediate and spaced from the longitudinal extremities of the glass on either side of the longitudinal axis passing through the center of gravity of the glass when the mold sections occupy their spread position.

References Cited by the Examiner
UNITED STATES PATENTS 3,094,403  6/1963  Jendrisak _____ 65—289 X
3,103,430  9/1963  Jendrisak _____ 65—290

DONALL H. SYLVESTER, *Primary Examiner.*

HOWARD R. CAINE, *Examiner.*

A. D. KELLOGG, *Assistant Examiner.*